(12) United States Patent
Hellman (10) Patent No.: US 9,639,085 B1
(45) Date of Patent: May 2, 2017

(54) PHUGOID PEAKS TRAJECTORY FOR HYPERSONIC GLIDE VEHICLES

(71) Applicant: The United States of America, as represented by Secretary of the Air Force, Washington, DC (US)

(72) Inventor: Barry M. Hellman, Bexely, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 97 days.

(21) Appl. No.: 14/818,559

(22) Filed: Aug. 5, 2015

(51) Int. Cl.
*G05D 1/00* (2006.01)
*G05D 1/06* (2006.01)
*G01C 23/00* (2006.01)
*B64C 31/00* (2006.01)
*B64C 30/00* (2006.01)
*B64G 1/24* (2006.01)

(52) U.S. Cl.
CPC ........... *G05D 1/0607* (2013.01); *B64C 30/00* (2013.01); *B64C 31/00* (2013.01); *B64G 1/24* (2013.01); *B64G 1/242* (2013.01); *G01C 23/005* (2013.01); *B64G 2001/245* (2013.01); *Y02T 50/80* (2013.01); *Y02T 50/84* (2013.01)

(58) Field of Classification Search
None
See application file for complete search history.

(56) References Cited

U.S. PATENT DOCUMENTS

| | | | |
|---|---|---|---|
| 5,102,072 A | * | 4/1992 | Egan ................... G05D 1/0825 244/181 |
| 8,761,966 B2 | | 6/2014 | Zhu et al. |
| 2013/0304369 A1 | | 11/2013 | Mathews et al. |
| 2014/0136029 A1 | | 5/2014 | Nagase et al. |

OTHER PUBLICATIONS

James A. Leavitt and Kenneth D. Mease. "Feasible Trajectory Generation for Atmospheric Entry Guidance", Journal of Guidance, Control, and Dynamics, vol. 30, No. 2 (2007), pp. 473-481. See p. 477 where phugoid motion inc. range.*

(Continued)

*Primary Examiner* — Redhwan K Mawari
*Assistant Examiner* — Edward Torchinsky
(74) *Attorney, Agent, or Firm* — AFMCLO/JAZ; Timothy Barlow (57) ABSTRACT

A new apparatus and method for determining trajectories for hypersonic glide vehicles significantly reduces integrated, or total, heat load, with little reduction in time to distance and maximum range. The new approach identifies a trajectory having large phugoid oscillations and plotting a glide trajectory along the peaks of the phugoid oscillations. The glide trajectory is determined by calculating a first altitude that results in a maximum lift to drag ratio trajectory having damped or small phugoid oscillations, then calculating a different altitude that results in larger phugoid oscillations, and higher phugoid peaks, and finally plotting a trajectory from the first altitude that follows the peaks of the higher phugoid oscillation trajectory. The thus calculated trajectory can be input into a glide vehicle guidance system for controlling the trajectory of the glide vehicle from a point where it reaches the first altitude.

6 Claims, 6 Drawing Sheets

(56) References Cited

OTHER PUBLICATIONS

Wadsley and McKinnery, Hypersonic Boost-Glide Vehicle Trajectory Optimization for Conventional Weapon Systems, AIAA Missile Sciences Conference, Monterey, CA (Nov. 16-18, 2010), available from Defense Technical Information Center (DTIC) as Accession Document (AD) No. ADA586066.
Fine, Jerome H. An Attitude Control System to Constrain the Skin Temperature of a Manned Lifting Spacecraft During Reentry Into the Earth's Atmosphere. No. UTIAS-126. Toronto Univ Downsview (Ontario) Inst for Aerospace Studies (1967).
Stengel, R. F, and M. L. Psiaki. "Analysis of aircraft control strategies for microburst encounter." Journal of Guidance, Control, and Dynamics 8, No. 5: 553-559, (1985).
Walter, Uso. "A study of the longitudinal low frequency (phugoid) motion of an airplane at supersonic and hypersonic speeds." PhD diss., California Institute of Technology (1967).
Benoit, Andre. Aircraft Trajectories Computation-Prediction-Control (La Trajectoire de l'Avion Calcul-Prediction-Controle). vol. 2. No. AGARD-AG-301-VOL-2. Advisory Group for Aerospace Research and Development Neuilly-Sur-Seine (France) (1990).
Stengel, Robert F. "Optimal guidance for the space shuttle transition." Journal of spacecraft and rockets 40, No. 6: 966-972 (2003).
Dalle, Derek J. "Interactions between Flight Dynamics and Propulsion Systems of Air-Breathing Hypersonic Vehicles." PhD diss., Air Force Research Laboratory (2013).
U.S. Conventional Prompt Global Strike: Issues for 2008 and Beyond, Committee on Conventional Prompt Global Strike Capability, Naval Studies Board, Division on Engineering and Physical Sciences, National Research Council National Academies Press, Dec. 8, 2008—Technology & Engineering—Portions of Two Pages (2008).
Eggers, Alfred J., H. Julian Allen, and Stanford E. Neice. A comparative analysis of the performance of long-range hypervelocity vehicles. vol. 1382. National Advisory Committee for Aeronautics (1957).
Jorris, Timothy R., Christopher S. Schulz, Franklin R. Friedl, and Anil V. Rao. "Constrained trajectory optimization using pseudospectral methods." In Proceedings of the AIAA Atmospheric Flight Mechanics Conference and Exhibit (2008).
Bryan, Josiah A. "Maximum-range trajectories for an unpowered reusable launch vehicle." PhD diss., University of Missouri—Columbia (2011).
Vinh, N. X., C-Y. Yang, and -S. Chern. "Optimal trajectories for maximum endurance gliding in a horizontal plane." Journal of Guidance, Control, and Dynamics 7, No. 2: 246-248 (1984).
Johannesen, J. R., N. X. Vinh, and K. D. Mease. "Effect of maximum lift to drag ratio on optimal aeroassisted plane change." In 12th Atmospheric Flight Mechanics Conference, vol. 1, pp. 399-407 (1985).
"Phugoid," Wikipedia, The Free Encyclopedia, (accessed Apr. 18, 2014).
"Attitude control," Wikipedia, The Free Encyclopedia, (accessed Apr. 18, 2014).
"Lift-to-drag ratio," Wikipedia, The Free Encyclopedia, (accessed Apr. 18, 2014).
"Hypersonic Technology Vehicle 2," Wikipedia, The Free Encyclopedia, (accessed Apr. 18, 2014).

* cited by examiner

PHUGOID PEAKS TRAJECTORY FOR HYPERSONIC GLIDE VEHICLES

RIGHTS OF THE GOVERNMENT

The invention described herein may be manufactured and used by or for the Government of the United States for all governmental purposes without the payment of any royalty.

BACKGROUND OF THE INVENTION

The present invention relates generally to hypersonic glide vehicles, and more specifically to glide trajectories that reduce heat loading from aerodynamic heating, primarily the total heat load over an entire glide trajectory, called integrated heat load, with little loss of range.

Hypersonic glide vehicles are launched to a high altitude on a rocket or other boost vehicle and then glide to their destinations at hypersonic speeds.

Future commercial hypersonic glide vehicles may provide travel times under an hour from London to New York, Los Angeles or Beijing; from New York to Beijing; and, from Los Angeles to Beijing or Sydney; and; under ninety minutes from London or New York to Sydney.

Proposed future commercial hypersonic glide vehicles include the SpaceLiner proposed as a part of the Euro-funded Future high-Altitude high-Speed Transport 20XX (FAST20XX) program.

Hypersonic glide vehicles have been studied since the 1930s, and extensively studied beginning in the mid-1940s. By the 1950's, balancing range and speed, hypersonic glide vehicles had emerged as the best choice over competing skip, skip-glide and ballistic trajectories for unpowered flight from above or near above the atmosphere.

A particular factor in making those determinations was heat from aerodynamic heating, primarily the heat from atmospheric friction. For example, while skip trajectories may be more efficient in converting the kinetic energy of such vehicles into range, the increased heat and other aerodynamic loads required to achieve those efficiencies are greater than most modern materials can handle.

Heat load primarily comprises instantaneous heat loading, the maximum rate of heating at any time during an entire glide trajectory and, often more importantly, the total heat load, or integrated heat load, over an entire glide trajectory.

Hypersonic glide vehicles can achieve their significant efficiencies within the limits of modern materials, but not without large amounts of heat shielding, significantly reducing available passenger and cargo space and weight carrying capacity, and often not without additional mechanically complex heat removing systems.

Such heat removing systems typically attempt to radiate the heat away from the vehicle and delay heat from entering the vehicle. Once heat enters the vehicle, additional internal components are needed to manage that internal heat.

The more integrated heat load can be reduced, not only can the need for heat shielding be reduced, but the need for elaborate heat removing systems eliminated.

Heat load can, of course, be reduced by reducing glide speed, such as by having the glide vehicle perform a slow spiral to return to earth. Reducing glide speed, however, reduces range and, more importantly, removes a primary reason for a hypersonic glide vehicle, time to destination.

The prior art has investigated a variety of different trajectories, or trajectory paths, for reducing heat load with minimum loss of both range and time to destination.

Hypersonic glide trajectory studies usually begin with a so-called maximum lift-to-drag ratio (L/D) glide where the angle of attack of a glide vehicle is held at an angle providing a maximum lift-to-drag ratio and can be shown to result in both minimum drag and maximum range.

Maximum L/D glide trajectories result, however, in higher speeds and higher instantaneous heat rates. A modified glide trajectory with constant speed limits the maximum speed, but reduces range.

The balance between speed and range can, of course, be adjusted by periodically trading speed for altitude by alternatively increasing and decreasing angle of attack. Increasing altitude helps preserve range, but also increases drag (and resulting integrated heat load) and time to destination.

Trading speed for altitude can occur naturally by so-called phugoid motion. A phugoid, pronounced "fēw-gōēd," motion is an oscillating aircraft motion where the aircraft pitches up and climbs, and then pitches down and descends, accompanied by speeding up and slowing down as it goes "uphill" and "downhill." Phugoid motion alternately trades kinetic for potential energy and back again. Phugoid motion is generally something sought to be avoided, or at least reduced.

A particular problem with such tradeoffs is integrated heat load, the total heat load over time. If some of the heat cannot be dissipated during glide, integrated heat load can be more critical than maximum instantaneous heat rate.

A good discussion of the prior art, and an example attempt at such a tradeoff, is in Wadsley and McKinnery, "Hypersonic Boost-Glide Vehicle Trajectory Optimization for Conventional Weapon Systems, AIAA Missile Sciences Conference, Monterey, Calif. (Nov. 16-18, 2010), available from the Defense Technical Information Center (DTIC) as Accession Document (AD) Number ADA586066.

In that paper and associated presentation, the authors explained that a phugoid trajectory maximizes range, is similar to a maximum L/D trajectory, but is undesirable for a variety of reasons, primary heat loading. They go on to describe a "smooth glide trajectory based on a glide of constant dynamic pressure . . . chosen over a constrained phugoid trajectory to minimize the number of 'pull up" maneuvers required . . . " However, "[t]he range penalty of the constant dynamic pressure glide is approximately 15% of the maximum kinematic range of the phugoid trajectory, but mitigates heating concerns and offers a more stable glide slope for maneuvering the HGV with simplified guidance strategies."

There is, therefore, a need for new glide trajectories that better balance integrated heat load against time-to-distance and range.

To meet that need, there is a particular need to reduce integrated heat load with much lower range loss than found in the prior art.

SUMMARY OF THE INVENTION

To address these challenges, the present invention provides a new glide trajectory that significantly reduces integrated heat load with little loss in time to distance and, likely more importantly, little reduction in range.

The new trajectory, called a balanced trajectory or a phugoid peaks trajectory, tracks the phugoid oscillation peak (top peaks as opposed to bottom peaks) points of a maximum lift to drag ratio (L/D) trajectory calculated to produce significant phugoid oscillations. That high phugoid oscillation peaks trajectory is calculated starting from an altitude different from the reference altitude calculated to produce small phugoid oscillation amplitudes during a maximum L/D trajectory, and the phugoid peaks trajectory following the peak points of the high phugoid oscillation peaks trajectory starts from the reference altitude. The resulting phugoid peak following balanced trajectory can be input into a conventional guidance system for controlling a gliding vehicle from when the gliding vehicle reaches the reference altitude.

The present invention includes both methods for determining a phugoid peaks trajectory and flight controller systems for guiding a gliding hypersonic vehicle along a phugoid peaks trajectory.

An advantage of using a phugoid peaks trajectory according to the teachings of the present invention is that significantly reducing the integrated aerodynamic heat load on a gliding vehicle, while only giving up a small amount of range compared to a conventional maximum lift to drag trajectory, not only allows a simpler and lighter weight design for both thermal protection and internal thermal management systems, possibly even eliminating a need for internal thermal management systems, by so doing, significantly reduces development time, production time and costs, and significantly reduces design risks.

The present invention also includes determining any useful outcome, capable of being described as a path, by following the top or bottom, or higher or lower, peak points of an interim path calculated to produce significant oscillations in that interim path, or by following the higher or lower peak points of an initial path.

BRIEF DESCRIPTION OF THE DRAWINGS

The teachings of the present invention will be better understood from the accompanying drawings illustrating various aspects and example embodiments of the invention and its teachings.

DETAILED DESCRIPTION

As described in the Background of the Invention, governments and industry have programs developing trajectory methods for utilizing the higher lift to drag (L/D) ratios designed into modern gliding vehicle concepts in order to meet range needs. There are many options available to mission analysts for executing gliding trajectories, including holding angle of attack at a maximum L/D point, varying angle of attack to fly a constant dynamic pressure and varying angle of attack to fly a constant flight path angle. Each method has advantages and will generate different inputs to a vehicle's control system. A common feature of typical trajectory methods for hypersonic glide vehicles is that they result in extreme amounts of both instantaneous heat rates and integrated heat loads.

In order to better manage a glide vehicle's heating, the present invention provides a unique approach that avoids sacrificing range while significantly reducing integrated heat load.

A trajectory path according to the teachings of the present invention uses the phugoid peak points of a modified maximum L/D trajectory. These phugoid peak points are used as targeting parameters for a guidance system and balance the need to reduce integrated heat load without sacrificing a large amount of range when compared to flying at a maximum lift-to-drag ratio.

The following description presents an example embodiment according to the teachings of the present invention for calculating or determining a trajectory, or trajectory path, according to the teachings of the present invention.

Figure 1:
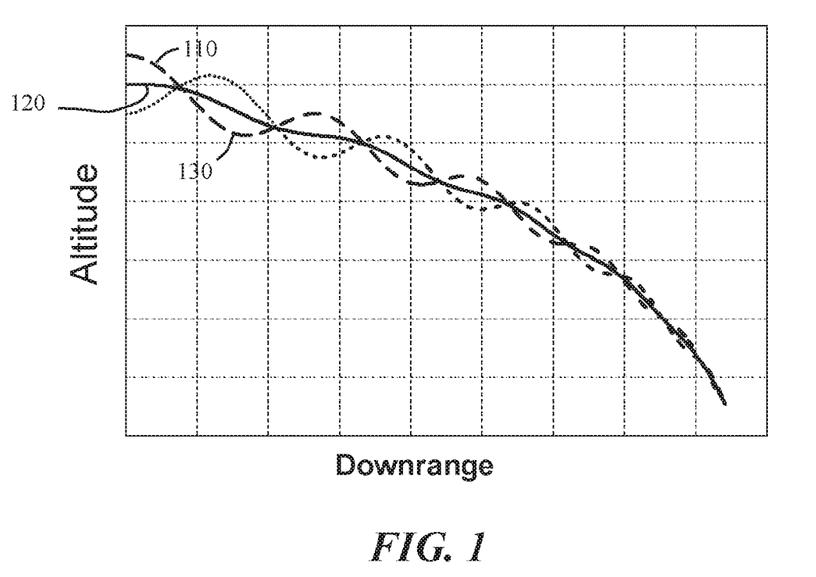
FIG. 1 shows different phugoid dynamic mode oscillations, or oscillation amplitudes, for three example trajectories having the same starting specific energy and starting from three different altitudes.

Hypersonic gliding trajectories are usually flown at the angle of attack for a vehicle's maximum lift to drag ratio (L/D). This provides aerodynamic efficiency for maximizing range. Simply holding the vehicle's angle of attack for maximum L/D will cover a great deal of range until reaching equilibrium. When a vehicle at hypersonic speeds flies at maximum L/D, it will usually be in a phugoid dynamic mode where there is a constant tradeoff between altitude and velocity. For a given vehicle's aerodynamics and wing loading, the phugoid will have various amplitudes when starting at different altitudes 110, 120 and 130 as shown in the FIG. 1 graph of different phugoid dynamic mode amplitudes for three example trajectories, each having the same starting specific energy. Specific energy is the total of kinetic and potential energy.

As previously described, hypersonic gliding trajectories are usually designed to maximize range. However, because of extreme speeds, there is significant aerodynamic heating that requires the vehicle to be built with special materials and makes for a difficult internal thermal management problem.

Including flying at maximum L/D, there are other straight-forward approaches to flying a boost glide trajectory. One approach is to fly at a constant dynamic pressure (0.5× density× velocity$^2$) until reaching the desired range. Some iteration is required with this approach to find the best dynamic pressure at which to fly. Another approach is to fly at a constant flight path angle until reaching the desired range. Again, some iteration is required to find the best flight path angle. If the flight path angle is too steep, the vehicle will lose range very quickly. If it is too shallow, the vehicle will have to fly at higher angles of attack which likely reduce the gliding efficiency. Both of these approaches avoid exciting the phugoid dynamic mode typical for a maximum L/D trajectory.

Example Embodiment

The teachings of the present invention can be implemented by use of such industry standard trajectory tools as POST (Program to Optimize Simulated Trajectories II), originally written Lockheed Martin Astronautics and NASA-Langley; and, OTIS (Optimal Trajectories by Implicit Simulation), originally written by The Boeing Corporation with NASA-Glenn Research Center. The vehicle inputs to the trajectory tool are vehicle weight, aerodynamic reference area and wing loading.

A hypersonic trajectory starts at the same specific energy state and ends at the same specific energy state as defined by a reference altitude and velocity. Specific energy is the sum of potential and kinetic energy. POST utilizes the specific energy equation used for orbital mechanics shown in Eq. (1). This formula for energy is zero for a circular orbit. For simplicity, aerodynamics are assumed to be constant over all Mach numbers and trimmed.

$$e = \frac{V_I^2}{2} - \frac{\mu}{r_I},$$ Eq. (1)

where
$\mu$=1.41×10$^{16}$ ft$^3$/sec$^2$ (Earth's Gravitational Parameter)
$V_I$=Inertial Velocity
$r_I$=Geocentric Altitude The trajectory method is modeled from a point in the trajectory where the glide vehicle's flight path angle is 0°. This reference altitude, where the resulting phugoid peak or balanced trajectory begins for purposes of implementing in a flight control system, does not need to occur at an arbitrary altitude where the "boost" from the boost vehicle is declared to have ended and a glide phase begun. As a practical matter, a boost vehicle does not perfectly drop away at separation, leaving its glide vehicle with a zero horizontal velocity. Not only are boost vehicles often designed to impart a horizontal boost before separation, glide vehicles often exhibit a slightly erratic trajectory from, for example, exo-atmospheric effects, before re-entering the atmosphere and beginning a more stable glide. At some point, that more stable glide reaches a target altitude, determined according to the teachings of the present invention, where the phugoid peaks trajectory, as input into the glide vehicle guidance system, begins to control the glide vehicle.

Prior to that time, other guidance algorithms, including guidance algorithms based on the teachings of the present invention, may be controlling the trajectory of the glide vehicle.

First, for a given energy state and vehicle design, find a reference altitude (also referred to as the low amplitude altitude) that gives small phugoid oscillation amplitudes in the phugoid dynamic mode when flying at the angle of attack for maximum L/D. This can be done with trajectory tools such as POST or OTIS. POST or OTIS will generate columns of data which can then be inputted into, for example, EXCEL, and EXCEL's plotting functions used to plot altitude vs. downrange distance to find this appropriate altitude. The trajectory from this reference altitude should be almost straight with almost no phugoid oscillations, and have the greatest range compared to starting at other altitudes (with the same specific energy).

Second, recalculate the maximum L/D glide trajectory from an altitude lower or higher than the low amplitude reference altitude. This altitude preferably is on the order of 3%-7% different, but is not so limited. The altitude is selected to produce greater amplitude differences in phugoid peaks than in the low amplitude reference altitude to better enable the teachings of the invention.

Figure 2:
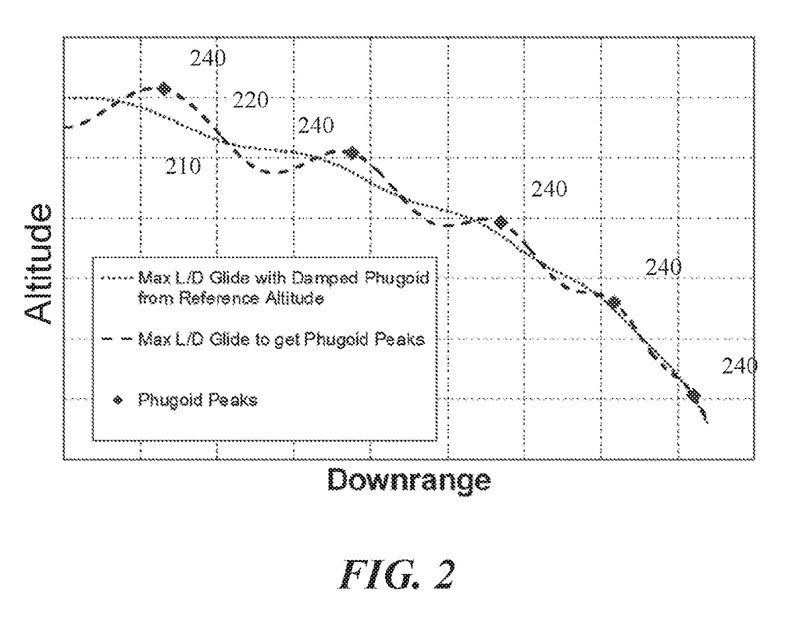
FIG. 2 shows phugoid oscillations, and resulting phugoid trajectory peaks, for two example hypersonic trajectories starting at different altitudes.

FIG. 2 illustrates these first two steps. Trajectory 210 is a maximum L/D glide trajectory selected for damped or constrained, that is, small phugoid oscillations and resulting low amplitude phugoid peaks. Trajectory 220 is a maximum L/D glide trajectory selected from a different altitude in order to produce large phugoid oscillation peaks producing peak points 240.

The difference between small and large oscillations is more a matter of kind than quantity in that oscillations that are too small do not result in a phugoid peaks trajectory materially different from the originally calculated trajectory, and oscillations that are too large result in an unworkable phugoid peaks trajectory.

Figure 4:
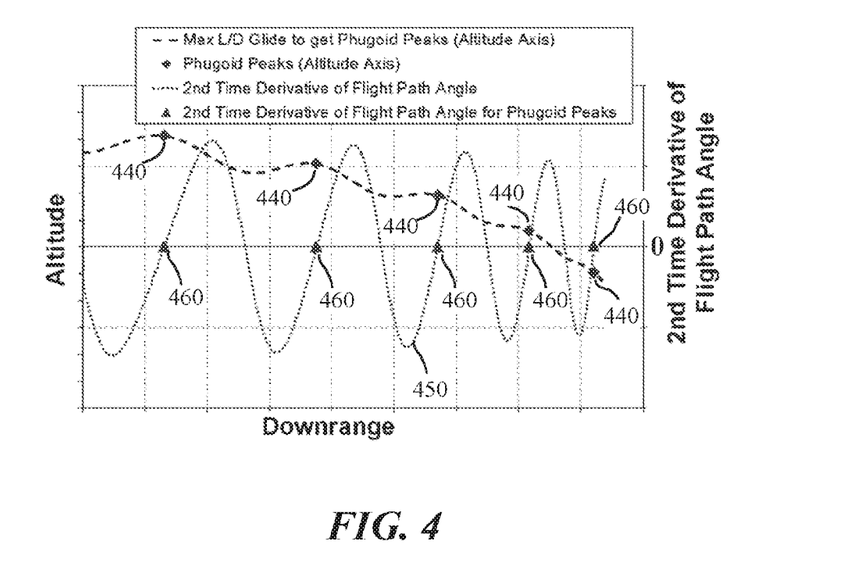
FIG. 4 shows phugoid peaks from a hypersonic maximum L/D ratio trajectory calculated from the $2^{nd}$ derivative of flight path angles.

Third, identify the flight conditions of the peaks of the trajectory chosen in the second step. One method is to find the points in the trajectory where the 2$^{nd}$ time derivative of the flight path angle is zero and goes from negative to positive as shown in FIG. 4.

Figure 3:
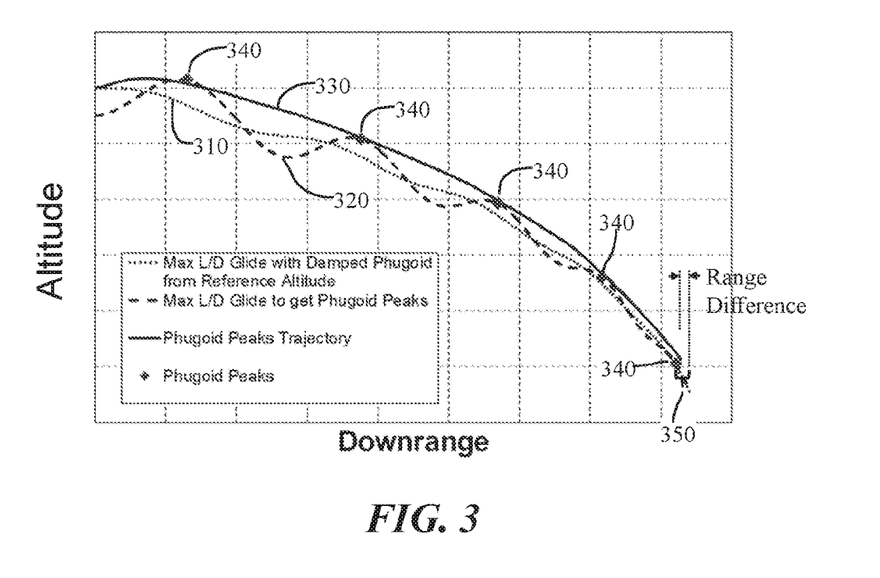
FIG. 3 shows an example phugoid peaks trajectory according to the teachings of the present invention determined by following the phugoid peaks of a trajectory calculated to produce large phugoid oscillations.

FIG. 3 shows an example application of these three steps. Trajectory 310 is a maximum L/D glide trajectory selected for damped or constrained, that is, small phugoid oscillations and resulting low amplitude phugoid peaks. Trajectory 320 is a maximum L/D glide trajectory selected from a different altitude in order to produce large phugoid oscillation peaks. Trajectory 330 is an example phugoid peaks trajectory according to the teachings of the present invention that follows the phugoid peak points 340 of trajectory 320. Range difference 350 shows the low loss of range from using a phugoid peaks trajectory according to the teachings of the present invention.

Figure 6:
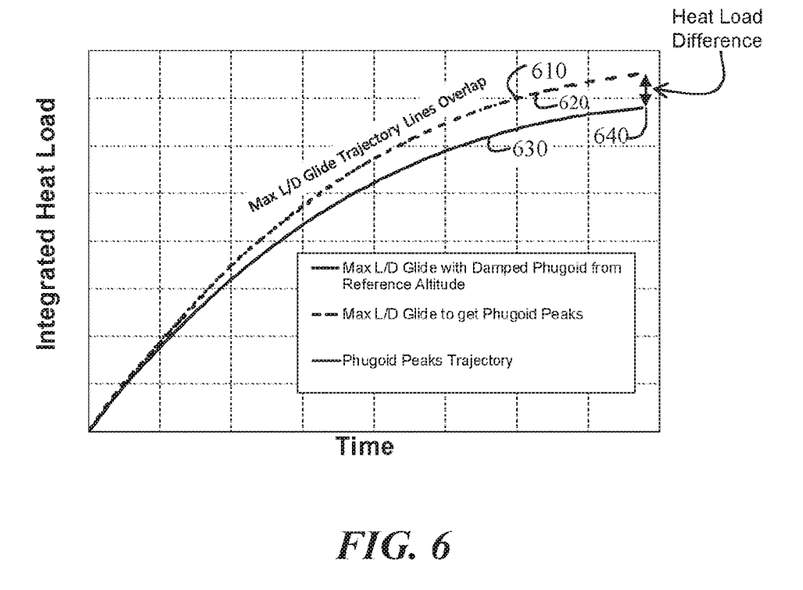
FIG. 6 shows integrated heat load vs. time for the trajectories shown in FIG. 3.

Trajectory 330 provides a maximum range difference only slightly less than trajectory 310, shown by difference 350, but with a much lower integrated heat load as will be shown in the description of FIG. 6.

Fourth, setup a guidance algorithm tracking these points. A way to feed these points into a guidance scheme is to input the specific energy as a function of altitude and linearly interpolate in-between the points.

Guidance algorithms and how to use them with flight controllers are well-known in the art and do not require detailed description. An example patent describing and illustrating some of the prior art is U.S. Pat. No. 8,761,966 to Zhu et al.

The second through fourth steps may need to be iterated to get a trajectory that meets vehicle controllability constraints such as higher angles of attack, and also meets desired balance of range performance versus lowering of integrated heat load. Because this trajectory method involves the peaks resulting from a phugoid dynamic mode, it is called the "Phugoid Peaks Trajectory Method."

Results. Using the just described teachings of the present invention, results of the Phugoid Peaks Trajectory Method for an example Mach 10 trajectory are shown in FIGS. 2-7.

FIG. 4 shows phugoid peak points 440 from a Mach 10 maximum L/D ratio trajectory 440 calculated from the 2$^{nd}$ derivative of flight path angles 450 at the points 460 where the value of the 2$^{nd}$ derivative goes from negative to positive.

Figure 5:
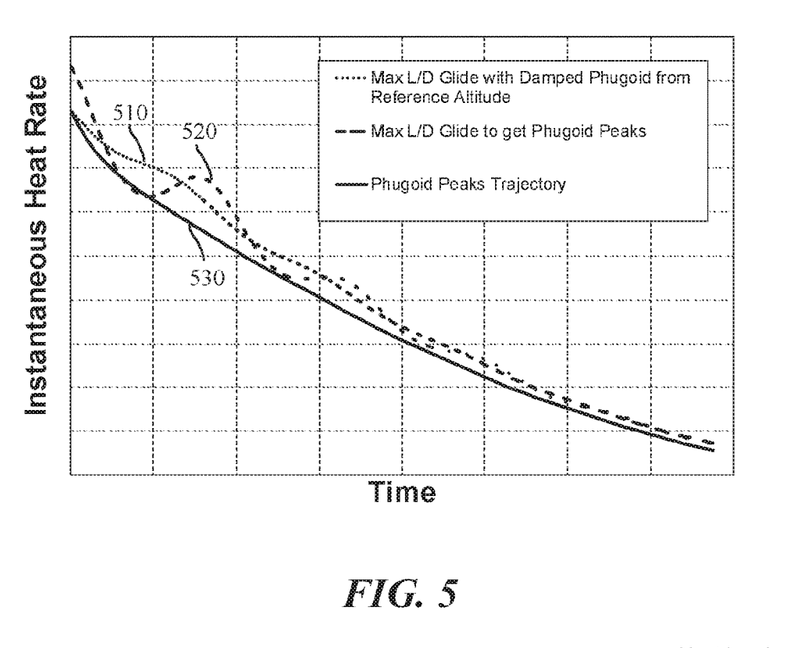
FIG. 5 shows instantaneous heat rate vs. time for the trajectories shown in FIG. 3.

FIG. 5 shows calculated instantaneous heat rate vs. time for trajectories 210, 220 and 230 shown in FIG. 3, indicated here as corresponding plots 510, 520 and 530, and that the instantaneous heat rate for phugoid peak trajectory 330 (plot 530) is lower than for each of a damped maximum L/D ratio trajectories 310 (plot 510) and a large phugoid oscillation maximum L/D ratio trajectory 320 (plot 520).

FIG. 6 shows calculated integrated heat load vs. time for trajectories 310, 320 and 330 shown in FIG. 3, shown here as corresponding plots 610, 620 and 630, and that the integrated, or total, heat load for phugoid peak trajectory 330 (plot 630) is lower than for each of a damped maximum L/D ratio trajectories 310 (plot 610) and a large phugoid oscillation maximum L/D ratio trajectory 320 (plot 620).

Figure 7:
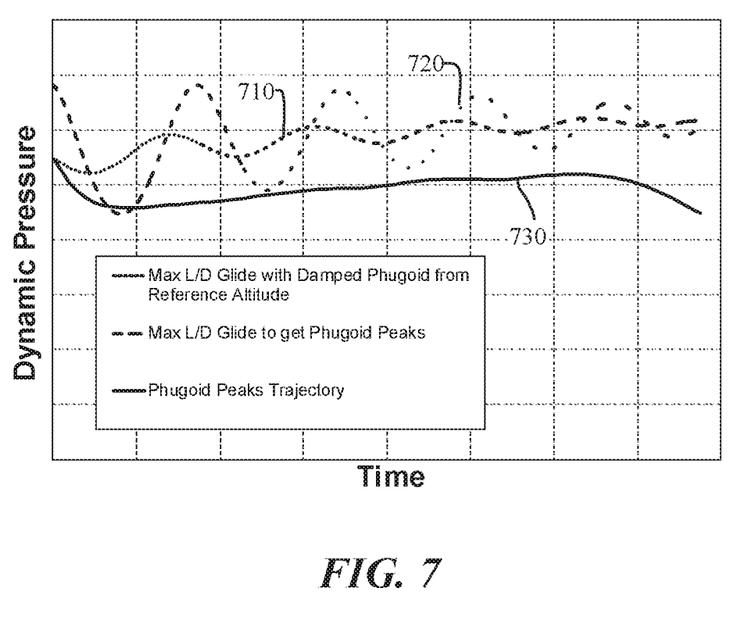
FIG. 7 shows dynamic pressure vs. time for the trajectories shown in FIG. 3.

FIG. 7 shows calculated dynamic pressure vs. time for trajectories 310, 320 and 330 shown in FIG. 3, and that the dynamic pressure for phugoid peak trajectory 330 (plot 730) is lower than for each of a damped maximum L/D ratio trajectories 310 (plot 710) and a large phugoid oscillation maximum L/D ratio 320 (plot 720).

Figure 8:
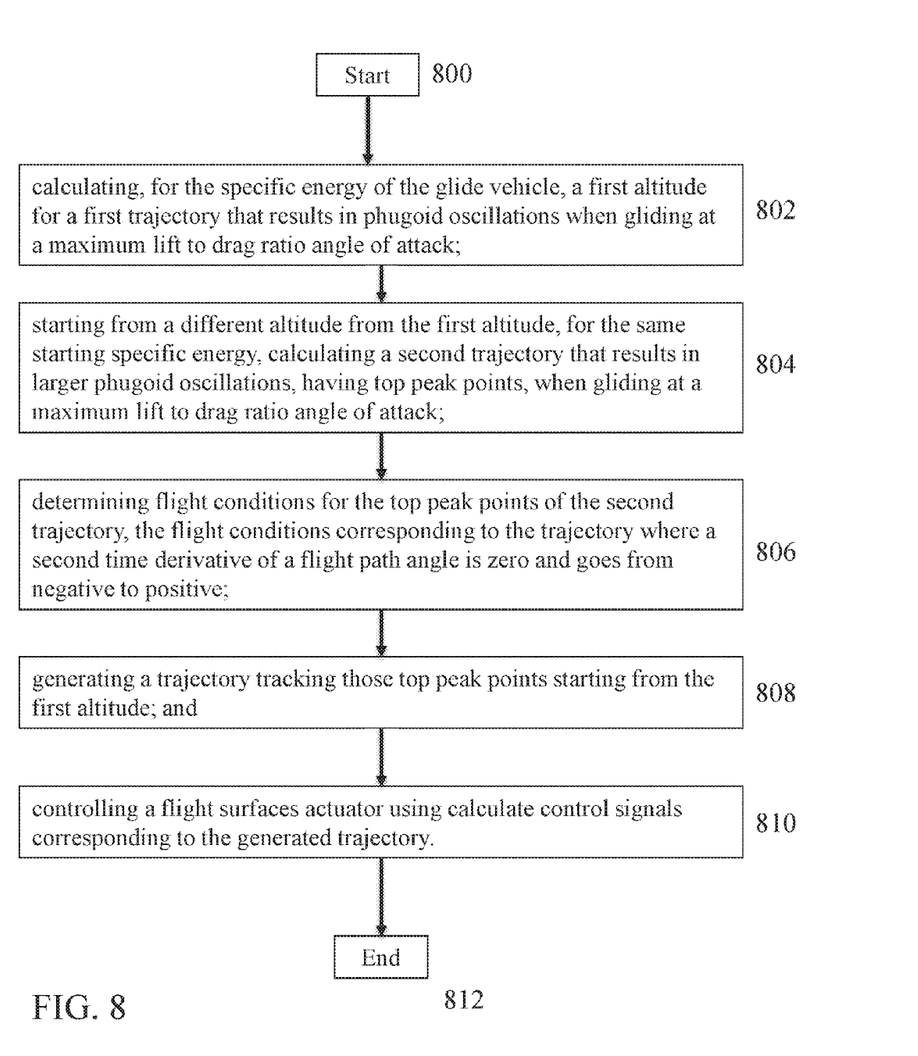
FIG. 8 depicts a method for determining a trajectory of a glide vehicle having a specific energy, according to an embodiment of the invention.

FIG. 8 depicts a method for determining a trajectory for a glide vehicle having a specific energy (step 800), comprising the steps of: (a) calculating, for the specific energy of the glide vehicle, a first altitude for a first trajectory that results in phugoid oscillations when gliding at a maximum lift to drag ratio angle of attack (step 802); (b) starting from a different altitude from the first altitude, for the same starting specific energy, calculating a second trajectory that results in larger phugoid oscillations, having top peak points, when gliding at a maximum lift to drag ratio angle of attack (step 804); (c) determining flight conditions for the top peak points of the second trajectory, the flight conditions corresponding to the trajectory where a second time derivative of a flight path angle is zero and goes from negative to positive (step 806); (d) generating a trajectory tracking those top peak points starting from the first altitude (step 808); and (e) controlling a flight surfaces actuator using calculated control signals corresponding to the generated trajectory (step 810), which ends the method (step 812).

Figure 9:
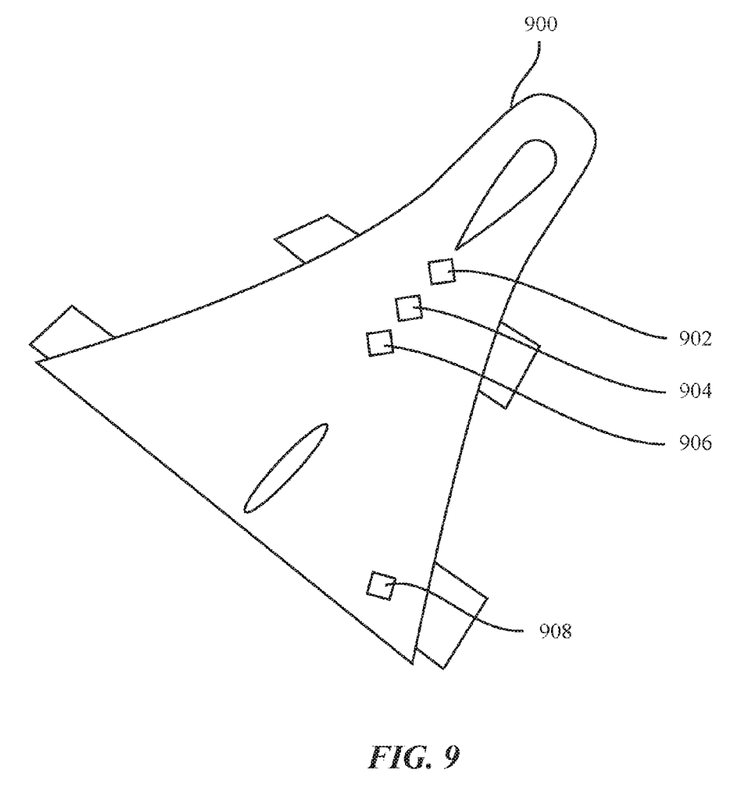
FIG. 9 illustrates a hypersonic glide vehicle, according to an embodiment of the invention.

FIG. 9 illustrates a hypersonic glide vehicle 900 such as may be employed according to the disclosed method. The glide vehicle 900 may include a guidance system 902, a sensor 904 for measuring a position, a controller 906, and an actuator 908 which may be used to apply control forces.

Those with skill in the art area of the invention will readily see that its teachings for using and calculating a phugoid peaks trajectory are not limited to maximum L/D ratio angles of attack, but may also be applied to other approaches such as gliding at constant flight path angle and at constant dynamic pressure.

Those having skill in the art will readily understand that the use of such terms as "an actuator" logically includes one or more actuators and has the same meaning as "at least one actuator."

Those having skill in the art area of the invention will also readily understand that the use of the absence of the term "small" in claim elements directed to a first or initial trajectory having "small" phugoid oscillations, or oscillation amplitudes, is because "small" is not a necessary limitation for describing the claimed invention, in that the term "larger," as in "larger phugoid oscillations," is the necessary limitation for describing the boundaries of the claim. As earlier described, differences between small and large are more a matter of kind than degree. Recognizing oscillation amplitudes that are neither too small nor too large to implement the teachings of the present invention will be routine for those having skill in the art.

The term "trajectory" is not limited to a flight trajectory, but includes broader meanings of trajectory as a family of curves or surfaces, such that those with skill in the art of the invention will readily see that the teachings of the present invention can be applied to any problem where results can be described as a path or surface, such as electromagnetic signals. Similarly, to avoid having to claim "path or surface," the term "path" as used in the claims is understood to include a path along a surface, which path can include all or part of an entire surface. Such a surface is not limited to three dimensions, such that it can be displayed graphically, but to surfaces of any number of dimensions. Similarly, "described" includes any mathematical notation, graphical or otherwise, and any and all other means for describing something.

The need for determining a second, or interim, trajectory is specific to applying the teachings of the present invention to gliding vehicle trajectories, and may not be required for other uses where a first, or initial, path may include sufficiently large oscillations for a final path to be determined along peak points of those oscillations. Those peak points may be either top or bottom peaks.

Both claims for determining and controlling trajectories for a glide vehicle, usually to determine and control trajectories having a lower integrated heat load over an entire trajectory (but not so limited in the claims) and claims directed to determining any "final path," are new solutions for the broader problem of determining a "better" (according to a selected criteria) path from an initial given path. They are also a new and specific application of following oscillation peaks, an approach used in a completely different way for modulating signal waves onto a carrier wave, where the purpose is to duplicate as closely as possible the signal wave and not to improve or otherwise change it.

The claims are to be interpreted with both logic and common-sense to claim all variations of the teachings of the present invention as would occur to one having skill in the art of the invention, including without reading in clearly unintended limitations.

For example, the common term for glide vehicles is "glide" vehicles, although they might also be called "gliding" vehicles, where "gliding" is a gerund noun. In this description and in the claims, use of the terms "glide" and "gliding" is intended to be more precise, with "glide" vehicle referring to an abstract glide vehicle and "gliding" vehicle referring to a vehicle while following a glide path. Nonetheless, in the event of an inadvertent error, those having skill in the art of the invention will readily be able to determine which meaning is meant.

Various modifications to the invention as described may be made, as might occur to one with skill in the art of the invention, within the scope of the claims. Therefore, not all contemplated example embodiments have been shown in complete detail. Other embodiments may be developed without departing from the spirit of the invention or from the scope of the claims.

I claim:

1. A method for determining a trajectory for a glide vehicle having a specific energy, comprising the steps of:
   (a) calculating, for the specific energy of the glide vehicle, a first altitude for a first trajectory that results in phugoid oscillations when gliding at a maximum lift to drag ratio angle of attack;
   (b) starting from a different altitude from the first altitude, for the same starting specific energy, calculating a second trajectory that results in larger phugoid oscillations, having top peak points, when gliding at a maximum lift to drag ratio angle of attack;
   (c) determining flight conditions for the top peak points of the second trajectory, the flight conditions corresponding to the trajectory where a second time derivative of a flight path angle is zero and goes from negative to positive;
   (d) generating a trajectory tracking those top peak points starting from the first altitude; and (e) controlling a flight surfaces actuator using calculated control signals corresponding to the generated trajectory.

2. The method for determining a trajectory according to claim 1, wherein step (c) comprises finding points in the trajectory where the second time derivative of the flight path angle is zero and goes from negative to positive.

3. The method for determining a trajectory according to claim 1, wherein step (d) includes inputting into a glide vehicle guidance system the specific energy as a function of altitude and linearly interpolating between top peak points.

4. A system for controlling the trajectory of a glide vehicle, comprising:
   (a) a sensor for measuring gliding vehicle position information;
   (b) an actuator for applying control forces to the gliding vehicle; and,
   (c) a controller for receiving sensor position information and sending control signals to the actuator, wherein the controller controls the vehicle to follow a trajectory along phugoid top peak points of a trajectory determined by:
      (i) calculating, for the specific energy of the gliding vehicle, a first altitude for a first trajectory that results in phugoid oscillations when gliding at a maximum lift to drag ratio angle of attack;
      (ii) starting from a different altitude from the first altitude, for the same starting specific energy, calculating a second trajectory that results in larger phugoid oscillation amplitudes, having top peak points, when gliding at a maximum lift to drag ratio angle of attack;
      (iii) determining flight conditions for the top peak points of the second trajectory, the flight conditions corresponding to the trajectory where a second time derivative of a flight path angle is zero and goes from negative to positive; and,
      (iv) generating a trajectory tracking those top peak points starting from the first altitude.

5. The system according to claim 4, wherein the sensor measures altitude and the controller controls the attitude of the vehicle to follow a trajectory along phugoid top peak points of a maximum lift to drag ratio trajectory.

6. A flight controller for controlling the trajectory of a glide vehicle, comprising a non-transitory computer readable medium including computer executable instructions for calculating control signals for sending to a flight surfaces actuator, wherein the flight controller controls the vehicle to follow a trajectory along phugoid top peak points of a trajectory determined by:
   (a) calculating, for a specific energy of the glide vehicle, a first altitude for a first trajectory that results in phugoid oscillations when gliding at a maximum lift to drag ratio angle of attack;
   (b) starting from a different altitude than the first altitude, for the same starting specific energy, calculating a second trajectory that results in larger phugoid oscillations, having top peak points, when gliding at a maximum lift to drag ratio angle of attack;
   (c) determining flight conditions for the top peak points of the second trajectory, the flight conditions corresponding to the trajectory where a second time derivative of a flight path angle is zero and goes from negative to positive;
   (d) generating a guidance algorithm including the computer executable instructions for calculating control signals; and
   (e) controlling a flight surfaces actuator using the calculated control signals.

* * * * *